United States Patent [19]

Stewart, Sr.

[11] Patent Number: 5,172,465
[45] Date of Patent: Dec. 22, 1992

[54] METHOD OF ASSEMBLING DYNAMOELECTRIC MACHINE BRUSH RIGGING

[75] Inventor: Kenneth W. Stewart, Sr., Columbus, Miss.

[73] Assignee: United Technologies Motor Systems, Inc., Columbus, Miss.

[21] Appl. No.: 605,219

[22] Filed: Oct. 29, 1990

Related U.S. Application Data

[62] Division of Ser. No. 503,507, Apr. 2, 1990, Pat. No. 5,006,747.

[51] Int. Cl.$^5$ .............................................. H02K 15/14
[52] U.S. Cl. ................................................ 29/597; 27/598
[58] Field of Search ................. 29/596, 597, 598, 450; 310/42, 239–242, 245–247

[56] References Cited

U.S. PATENT DOCUMENTS

| | | | |
|---|---|---|---|
| 2,120,457 | 6/1938 | Beauchamp | 171/320 |
| 3,026,432 | 3/1962 | Baumhart | 310/239 |
| 3,087,081 | 4/1963 | Apostoleris | 310/239 |
| 3,716,735 | 2/1973 | Dippold | 310/240 |
| 4,293,789 | 10/1981 | King | 310/239 |
| 4,423,549 | 1/1984 | King | 29/597 |
| 4,498,230 | 2/1985 | Harris et al. | 29/597 |
| 4,546,280 | 10/1985 | Pfluger | 310/68 D |
| 4,561,174 | 12/1985 | Gibli | 29/597 |
| 4,596,941 | 6/1986 | Kluck | 310/239 |
| 4,694,214 | 9/1987 | Stewart, Sr. | 310/239 |
| 4,774,754 | 10/1988 | Stewart, Sr. | 29/596 |
| 4,866,322 | 9/1989 | Baumeister et al. | 310/242 X |

*Primary Examiner*—Carl E. Hall
*Attorney, Agent, or Firm*—Ronald G. Cummings

[57] ABSTRACT

A dynamoelectric machine of the type having rolling element bearing assemblies larger than the commutator and armature and brushcard subassemblies for automated assembly with the brushcard having a displaceable brush retainer for retaining the brushes to form an unobstructed passageway for the bearing assembly and the armature having a self-positioning actuator disk for automatically displacing the brush retainer during assembly so the brushes engage the commutator.

3 Claims, 1 Drawing Sheet

U.S. Patent
Dec. 22, 1992
5,172,465
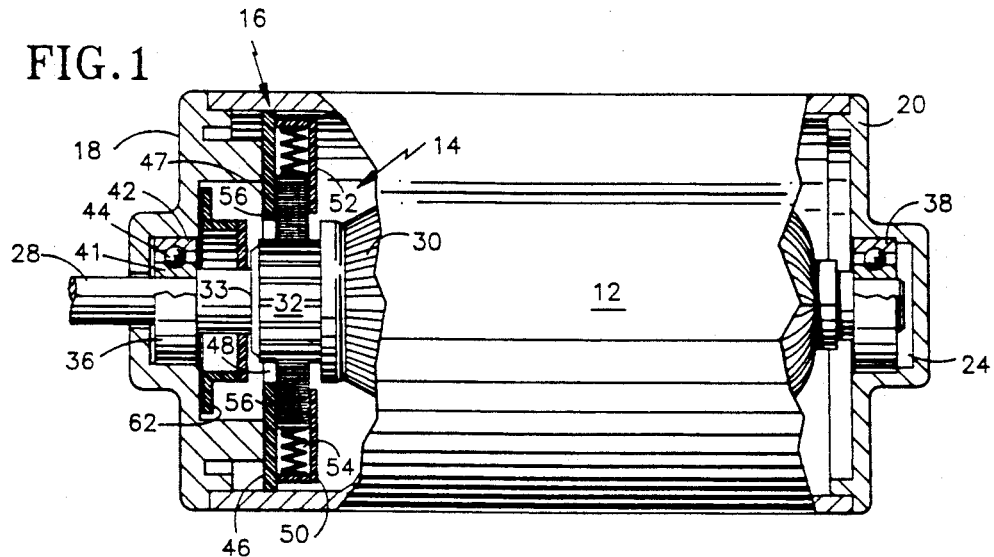
FIG.1
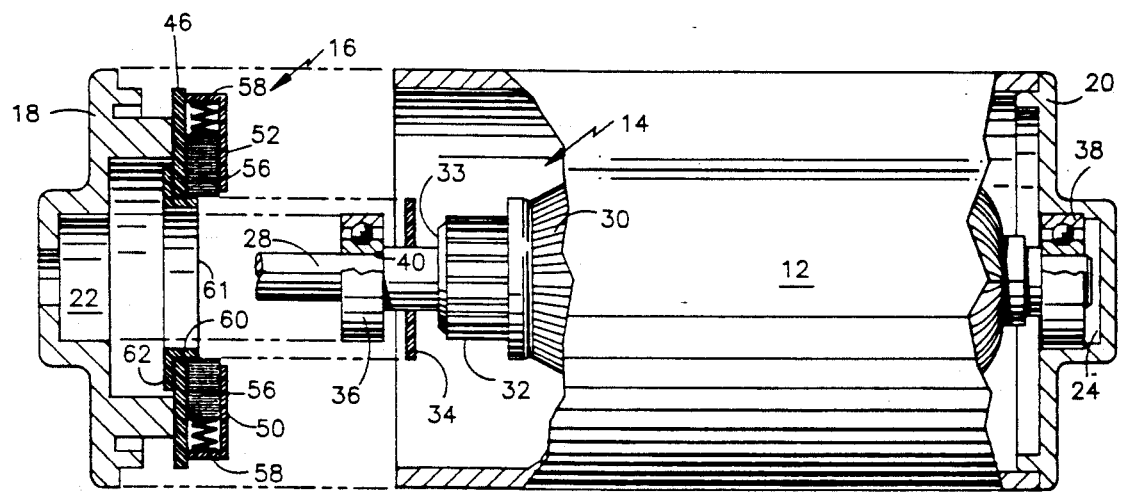
FIG.2
FIG.3

METHOD OF ASSEMBLING DYNAMOELECTRIC MACHINE BRUSH RIGGING

This is a division of copending application Ser. No. 07/503,507 filed on Apr. 2, 1990, now U.S. Pat. No. 5,006,747.

BACKGROUND AND SUMMARY OF THE INVENTION

This invention relates to dynamoelectric machines and more particularly to a brushholder and technique which facilitates automated assembly of such machines.

The brush riggings for motors, generators and the like vary in design, but in general consist of boxes to house the brushes, a spring means to apply pressure to the brushes to urge them against a commutator, connecting electrical leads to provide a current path to the brushes and a mounting surface to secure these elements as well as to provide some means to secure the entire assembly to the motor in such a manner as to place the brushes in a proper working relationship with the commutator.

One of the most popular designs, especially for small fractional horsepower motors, is to utilize a molded brushcard member of one-piece construction formed from a high temperature resistant plastic which is electrically nonconductive. The member has the brush boxes formed thereon as well as various openings for securing it to the motor housing and for receiving an extended armature shaft and the commutator secured to the shaft.

The prior riggings present problems when they are contemplated for use in an automated assembly process. In particular, while assembling the armature in a motor, complicated movements would have to be performed by the automation equipment to hold the brushes back in the brush box against the pressure being applied to the brushes by the spring means until such time as the commutator is positioned to receive the brushes.

Although this is particularly a problem for automated assembly of motors, it also applies to those units being assembled by hand as special tools and fixtures have previously been required to hold the brushes while the armature is being assembled.

In the assembly of dynamoelectric machines of the type wherein the armature shaft is mounted in bushing bearings, various types of retainers have been utilized to secure the brushes within the brush box until the armature is assembled thereto. Exemplary brush retainers are disclosed in King, U.S. Pat. No. 4,293,789 issued Oct. 6, 1981 and the commonly owned Stewart, Sr., U.S. Pat. No. 4,694,214 issued Sept. 15, 1987 which is incorporated herein by reference. In dynamoelectric machines such as those disclosed in King and Stewart, Sr., the commutator functions to displace a brush retainer upon assembly of the brushbox to the armature. In such machines, the brush retainer need only hold back the brushes to provide an unobstructed passageway for the armature shaft and commutator until the commutator is positioned adjacent the brushes.

However, in dynamoelectric machine applications such as continuous duty motors, bearing assemblies of the rolling element type must be utilized rather than bushing mounts. In these types of machines, the bearing assembly is secured to the armature shaft before the brushcard is positioned with respect to the commutator. Consequently, the bearing assembly must also be passed through the brush rigging in positioning the brushcard. Since the diametral size of the bearing assembly may be greater than the commutator, the brush holders described in King and Stewart, Sr., cannot be utilized.

Accordingly, it is an object of the present invention to provide a new and improved brushcard subassembly which facilitates automated assembly of dynamoelectric machines having rolling element bearings.

Another object of the invention is to provide such a brushcard subassembly which facilitates automated mounting over a large bearing assembly secured to the armature shaft.

A further object of the invention is to provide such a brushcard subassembly which automatically releases the brushes to engage the commutator upon positioning the commutator within the brushcard subassembly.

Another object of the invention is to provide a new and improved method of automated assembly of dynamoelectric machines having rolling element bearings larger than the commutator.

Another object of the invention is to provide a safe, economical, easy to assemble and reliable dynamoelectric machine.

It has been found that the foregoing and related objects are attained in a dynamoelectric machine having an armature subassembly and a cooperating brushcard subassembly for mounting about the commutator of the armature subassembly. The armature includes an armature shaft, armature windings, a commutator mounted to the armature shaft adjacent the windings, and an antifriction bearing assembly mounted to the armature shaft in spaced disposition to the commutator. The bearing assembly has an outer diametral dimension greater than the commutator. The armature subassembly also includes an actuator for displacing a brush retainer on the brushcard subassembly. The actuator is mounted to the shaft between the bearing assembly and the commutator. The brushcard subassembly includes a support bracket for mounting brush holders radially adjacent the commutator with the bracket defining a central opening to receive the commutator. The central opening is dimensioned to be larger than the diametral dimension of the bearing assembly so as to permit the bearing assembly to pass therethrough. At least one brush holder is mounted to the support bracket so as to extend radially relative to the commutator in assembly. A brush is slidably mounted in the holder with a biasing spring to urge the brush into contact with the commutator. A displaceable retainer is mounted to the support bracket for retaining brushes radially outwardly so as to form an unobstructed central passageway greater than the diametral dimension of the bearing assembly to permit the bearing assembly to pass through the passageway and through the central opening of the support bracket during assembly. The retainer is releaseably mounted to the support bracket for automatic displacement by the actuator upon placement of the commutator into the central opening of the support bracket to allow the brush to engage the commutator. The retainer is a cylindrical sleeve releasably mounted within the central opening of the support bracket for axial displacement by the actuator. The actuator is a disk coaxially mounted to the armature shaft for sliding movement along the shaft responsive to engagement with the sleeve during assembly to position the disk to abut the commutator for movement therewith so that movement of the commutator into the central opening causes the disk to displace the sleeve axially from the brushcard to release the brushes so as to engage the commutator.

BRIEF DESCRIPTION OF THE DRAWINGS

FIG. 1 is a partly broken away sectional view of a dynamoelectric machine in assembly with the brushcard of the present invention.

FIG. 2 is a partly broken away sectional view similar to FIG. 1 but showing the brushcard and armature subassemblies in their relative preassembly configurations.

FIG. 3 is a perspective view of the brushcard subassembly of FIG. 2.

DESCRIPTION OF THE PREFERRED EMBODIMENT

Although specific forms of the present invention have been selected for illustration in the drawings, and the following description is drawn in specific terms for the purpose of describing these forms of the invention, the description is not intended to limit the scope of the invention which is defined in the appended claims.

Referring to FIGS. 1 and 2, a dynamoelectric machine according to the present invention is shown in the form of a small fractional horsepower DC motor which generally comprises a motor housing, an armature, and a brushcard. The assembled motor is shown in FIG. 1 while FIG. 2 depicts the brushcard subassembly 16 just prior to mounting to the armature subassembly 14.

The housing 12 is cylindrical in shape and enclosed by endcaps 18, 20. The endcaps 18, 20 each have a central recess 22, 24 respectively for press mounting the antifriction bearings of the armature subassembly 14. Permanent magnets (not shown) are mounted to the interior of the housing 12.

The armature 14 comprises an armature shaft 28 a plurality of windings 30, a commutator 32, an actuator disk 34, and ball bearing assemblies 36, 38. The commutator 32 is mounted to the shaft 28 adjacent the windings 30. The shaft 28 has a shoulder portion 40 and the ball bearing 36 is press-fit mounted to the shaft against the shoulder portion 40. The ball bearing assembly 36 is of conventional design having an inner race 41 press-fit mounted to the shaft 28, an outer race 42 and a plurality of ball bearing elements 44 mounted therebetween (only one of which is shown). The outside diameter of the bearing assembly is greater than the commutator 32. The bearing assembly 38 is similarly configured and mounted to the opposite end of shaft 28. The bearing assemblies 36, 38 are press mounted within the recesses 22, 24 respectively to support the armature for rotation within the housing 12.

The brushcard 16 comprises a circular support plate 46 having a central opening 48 to receive the commutator 32. A pair of opposing brushcard boxes 50, 52 are mounted to the support plate 46 and extend radially outward from the central opening 48. Each brushcard box 50, 52 defines a cavity 54 mounting a brush 56 therein for reciprocating movement with a spring 58 urging the brush 56 into contact with the commutator 32. Electrical leads 57 (shown only in FIG. 3) provide an electrical connection to the brushes 56 in a conventional manner as described in U.S. Pat. No. 4,694,214 which is incorporated herein. The endcap 18 is secured to the support plate 46 by bolts (not shown) or the like. Alternately, the endcap 18 and brushcard 16 can be of unitary construction and may be integrally formed from an electrically nonconductive material such as plastic.

Referring to FIG. 2, the pre-assembly position of the brushcard subassembly 16 and armature subassembly 14 is shown. In this position, the bearing assembly 36 has been mounted to the shaft 28. Notably, the diameter of the bearing assembly 36 is greater than the diameter of the commutator 32 and must be passed through the brushcard 16 for press mounting in the recess 22 of endcap 18. In order to allow the bearing assembly 36 to pass through the brush rigging, a brush retainer sleeve 60 holds the brushes 56 radially outwardly to define an unobstructed passageway. The retainer sleeve 60 is generally cylindrical with an annular flange 62 at one end. The sleeve 60 is friction-fit mounted within the central opening 48 of support plate 46 so as to facilitate displacement by the actuator disk 34 as described hereinafter. In the preassembly position, the outer circumferential surface of the sleeve 60 engages a portion of the lower end of the brushes 56 to retain the brushes against the inward biasing force of the brush springs 58. The flange portion 62 engages the face 47 of support plate 46 to position the sleeve 60 within the central opening 48. Importantly, the inside diameter of the sleeve 60 is sufficiently greater than the outside diameter of the bearing assembly 3 to allow the bearing assembly to pass unobstructed therethrough during assembly.

The actuator disk 34 is loose-fit or slidably mounted on the shaft 28 between the bearing assembly 36 and the commutator 32. The actuator disk is dimensioned and configured so as to engage and displace the retainer sleeve 60 upon assembly of the brushcard 16 to the armature 14. The outside diameter of the circular disk 34 is greater than the inside diameter of the retainer sleeve 60 but less than the central opening 48 so that the disk 34 engages the interior end 61 of sleeve 60 and displaces it axially outwardly from the central opening as the commutator 32 is positioned within the central opening 48.

In positioning the commutator 32 within the brushcard 16, the bearing assembly 36 passes through the retainer sleeve 60 and the actuator disk 34 engages the interior end 61 of the retainer sleeve. Further axial movement of the armature 14 will cause the actuator disk 34 to slide along the shaft 28 until it abuts the end face 33 of the commutator 32. At that point, the actuator disk abuts the retainer sleeve 60 and the commutator 32, and further axial movement of the armature 14 will cause the commutator to drive the actuator disk to displace the retainer sleeve axially outwardly so it disengages from the brushcard 16 and releases the brushes 56 to engage the commutator 32. Since the disk abuts the end face 33 of the commutator 32, the commutator will necessarily be positioned adjacent the brush boxes 50, 52 when the disk displaces the brush retainer 60 so that the brushes will then engage the outer circumferential surface of the commutator. As can be appreciated, the pre-assembly position of the disk 34 along the shaft 28 between the bearing assembly 36 and the commutator 32 is not critical since the disk 34 is self-positioning in that it will be automatically positioned against the commutator 32 when the disk displaces the brush retainer sleeve. In assembly, the retainer sleeve 60 and the actuator disk 34 are positioned between the bearing assembly 36 and the brushcard 16 as shown in FIG. 1 and do not interfere with the operation of the motor. If necessary during repair of the motor, the sleeve may be repositioned in the brushcard to retain the brushes for reassembly.

In an automated method of assembly of a motor according to the present invention, the bearing assemblies 36, 38 are secured to the opposing end portions of the armature shaft 28 prior to mounting in the housing 12. The armature is positioned within the housing 12 with the bearing assembly 38 being mounted within the endcap 20. The brushes 56 of the brushcard subassembly 16 are releasably retained by the retainer sleeve 60 to provide an unobstructed passageway through the brush rigging for passing the bearing assembly 36 therethrough for mounting in the endcap 18. After the bearing assembly 36 has been passed through the brush rigging by the relative axially-aligned movement of the brushcard subassembly 16 and armature subassembly 14, the brushes are automatically released when the actuator disk displaces the retainer sleeve from the brushcard so that the brushes are urged into engagement with the commutator by the brush springs 58. Accordingly, this automated method of assembly has particular utility in assembling motors with rolling element bearing assemblies larger than the commutator.

While the invention has been described herein relative to small fractional horsepower motors which are designed to facilitate assembly, it is to be understood that this invention has like applicability to other types of dynamoelectric devices which utilize brushes and to various sized devices and motors which are manually assembled.

As can be seen, a brushcard subassembly and techniques have been described which facilitate automated assembly of dynamoelectric machines utilizing large rolling element bearings. The brushcard subassembly particularly facilitates automated mounting over a large bearing assembly secured to the armature shaft while achieving automatic release of the brushes in position to engage the commutator.

As will be apparent to persons skilled in the art, various modifications and adaptations of the structure and method above-described will become readily apparent without departure from the spirit and scope of the invention, the scope of which is defined in the appended claims.

What is claimed is:

1. A method of automated assembly of a dynamoelectric machine having an armature subassembly with an armature shaft, a commutator mounted to the shaft, and an antifriction bearing assembly having a diametral dimension greater than said commutator, and a brushcard subassembly with at least one brush for engaging the commutator and a central opening larger than said bearing assembly which comprises the steps of
   securing the antifriction bearing assembly to the shaft in spaced disposition to the commutator,
   releasably retaining the brush in a retracted position so as to form an unobstructed passageway sufficient for passing the antifriction bearing assembly therethrough,
   passing the antifriction bearing assembly mounted to the shaft axially through the passageway of the brushcard subassembly to position the commutator within the central opening of the brushcard subassembly, and
   automatically releasing the brush when the commutator is positioned within the central opening of the brushcard subassembly.

2. A method of automated assembly of a dynamoelectric machine having an armature subassembly with an armature shaft, a commutator mounted to the shaft, and an antifriction bearing assembly having a diametral dimension greater than said commutator, and a brushcard subassembly with at least one brush for engaging the commutator and a central opening larger than said bearing assembly which comprises the steps of
   securing the antifriction bearing assembly to the shaft in spaced disposition to the commutator,
   releasably retaining the brush in a retracted position by an axially displaceable retainer element so as to form an unobstructed passageway sufficient for passing the antifriction bearing assembly therethrough,
   passing the antifriction bearing assembly mounted to the shaft axially through the passageway of the brushcard subassembly to position the commutator within the central opening of the brushcard subassembly, and
   automatically releasing the brush when the commutator is positioned within the central opening of the brushcard subassembly, said step of releasing the brush comprising axially displacing the retainer away from the brush by an actuator element mounted to the shaft between the bearing assembly and the commutator so as to engage and displace the retainer element upon passing the antifriction bearing assembly through the passageway of the brushcard subassembly to position the commutator within the central opening of the brushcard subassembly.

3. A method of automated assembly of a dynamoelectric machine having an armature subassembly with an armature shaft, a commutator mounted to the shaft, and an antifriction bearing assembly having a diametral dimension greater than said commutator, and a brushcard subassembly with at least one brush for engaging the commutator and a central opening larger than said bearing assembly which comprises the steps of
   press-fit mounting the antifriction bearing assembly to the armature shaft in spaced disposition to the commutator,
   releasably retaining the brush in a retracted position by an axially displaceable retainer element so as to form an unobstructed passageway sufficient for passing the antifriction bearing assembly therethrough,
   passing the antifriction bearing assembly mounted to the shaft axially through the passageway of the brushcard subassembly to position the commutator within the central opening of the brushcard subassembly, and
   automatically releasing the brush when the commutator is positioned within the central opening of the brushcard subassembly, said step of releasing the brush comprising axially displacing the retainer away from the brush by an actuator element mounted to the shaft between the bearing assembly and the commutator so as to engage and displace the retainer element upon passing the antifriction bearing assembly through the passageway of the brushcard subassembly to position the commutator within the central opening of the brushcard subassembly.

* * * * *